Dec. 16, 1952  A. LOFT  2,621,676
HYDRAULIC PILOT VALVE WITH REACTION COMPENSATING MEANS
Filed Nov. 16, 1950

Inventor:
Arne Loft,
by Ernest C. Britton
His Attorney.

Patented Dec. 16, 1952

2,621,676

UNITED STATES PATENT OFFICE 2,621,676

HYDRAULIC PILOT VALVE WITH REACTION COMPENSATING MEANS

Arne Loft, Schenectady, N. Y., assignor to General Electric Company, a corporation of New York Application November 16, 1950, Serial No. 196,055

6 Claims. (Cl. 137—622)

Conventional hydraulic servomotors ordinarily consist of a double-acting hydraulic motor having an output member which moves in accordance with the supply of liquid thereto, as controlled by a pilot valve. In certain hydraulic regulating systems, the input force available for positioning the pilot valve is extremely small, with the result that any unbalanced hydraulic forces which may occur on the pilot member during normal operation must be reduced to a minimum.

In almost any valve having a flow controlling member which moves to define an orifice of varying size, it will be found that, when the valve first opens, there is a high velocity flow past the flow control member which results in the creation of a non-uniform local static pressure distribution on the flow control member having a tendency to return it to the closed position. This reaction force acting in the valve-closing direction increases to a maximum as the pilot valve travel increases, and then again decreases to zero as the valve moves to its fully open position. With a hydraulic pilot valve of the general type described herein, the maximum value of this reaction force is found to occur at about ¼ travel of the pilot member.

When the available input signal force is small, the effect of the reaction force has a substantial tendency to cause the operation of the servomotor to become erratic or deviate from the intended schedule of motor output movement versus pilot valve input.

Accordingly, the object of the present invention is to provide improved hydraulic pilot valve arrangements with novel means for counteracting the hydraulic reaction forces so that the net unbalanced force on the movable pilot member is very substantially reduced.

Figure 1:
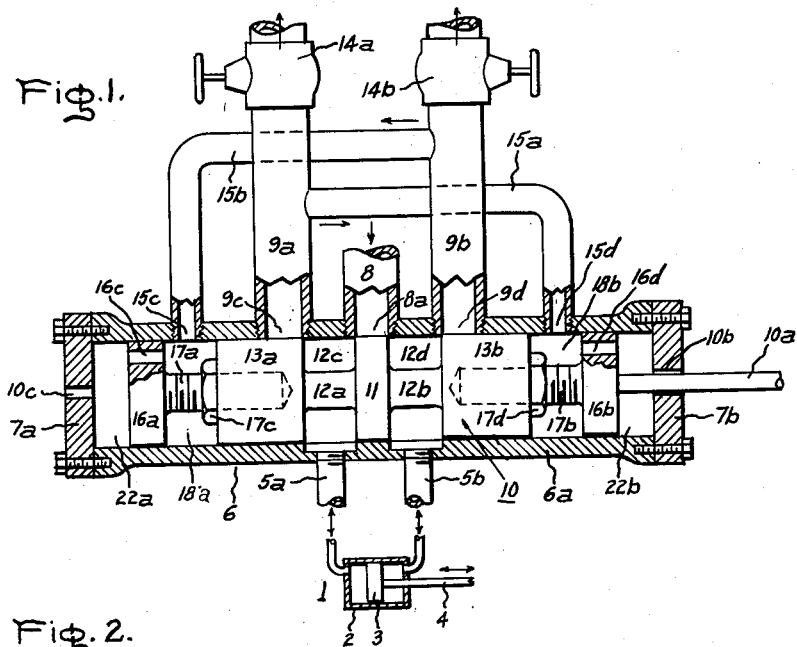
Figure 2:
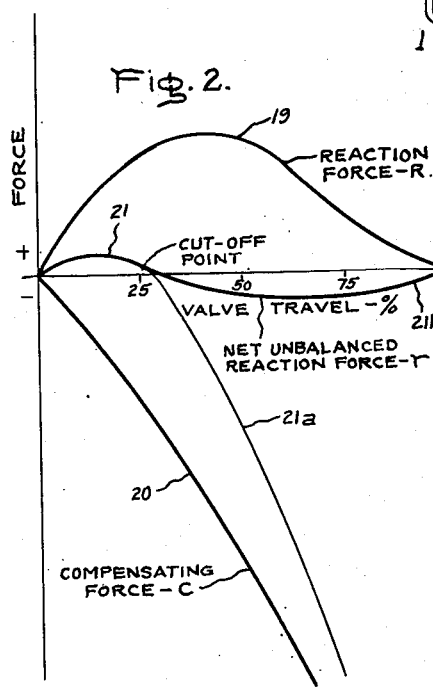
Figure 3:
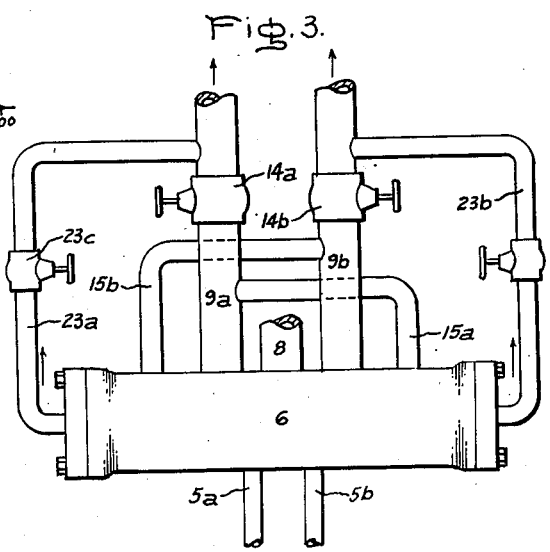
Figure 4:
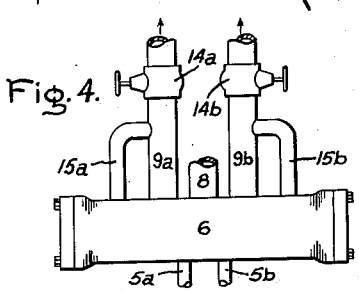

Other objects and advantages will become apparent from the following description taken in connection with the accompanying drawings, in which Fig. 1 is a sectional view of an improved double-acting hydraulic pilot valve incorporating the invention; Fig. 2 is a graphical representation of the forces on the movable pilot member; Fig. 3 illustrates a modification of the pilot valve shown in Fig.1; and Fig. 4 represents a still further modification.

Generally, the invention is practiced by providing the drain conduits from the hydraulic motor with flow-restricting means and communicating the pressure at the upstream side of these restrictions to the extreme end surfaces of the movable pilot valve spindle in such a manner that the pressure of the exhaust liquid modifies the unbalanced reaction force produced by the incoming motive fluid on the spindle. An extra pair of adjustable lands are provided at either end of the spindle for variably cutting off the supply of this compensating liquid from the discharge conduits.

Referring now more particularly to Fig. 1, my improved servomotor is illustrated as comprising a double-acting piston-type hydraulic motor shown diagrammatically at 1 as having a cylinder 2 containing a longitudinally slidable piston 3 with a rod 4 which constitutes the power output member of the motor. Motive liquid is supplied to the respective ends of the cylinder 2 by inlet conduits 5a, 5b, as controlled by the novel pilot valve indicated generally at 6.

Pilot valve 6 comprises a cylindrical housing 6a having a longitudinal bore extending entirely therethrough and closed at the respective ends by end caps 7a, 7b, which may be secured by suitable threaded fastenings, as shown in Fig. 1.

The motive fluid, a suitable liquid at any appropriate pressure, is supplied to the pilot valve housing 6a by an inlet conduit 8. Spent motive fluid from the hydraulic motor 1 is drained from the pilot valve housing 6a by exhaust conduits 9a, 9b.

The flow control member of the pilot valve comprises a longitudinally slidable spindle indicated generally at 10 and comprising a central land 11 connected by reduced diameter spindle portions 12a, 12b with the primary flow control lands 13a, 13b. It will be apparent from the drawing, and well understood by those skilled in the art, that the central land 11 just covers the inlet port 8a when in the neutral position, while the primary lands 13a, 13b just cover the drain ports 9c, 9d. The reduced diameter spindle portions 12a, 12b, define annular chambers with the housing 6a which are always in communication with the respective motor supply conduits 5a, 5b.

The pilot valve arrangement described thus far follows conventional practice in the hydraulic servomotor art.

In accordance with the invention, each drain line 9a, 9b is provided with a flow restriction, illustrated diagrammatically in the drawing as being a pair of adjustable throttling valves 14a, 14b. At the upstream side of valve 14a, a compensating conduit 15a communicates the exhaust liquid pressure to the annular chamber defined between the end surface of primary land 13b and a secondary land 16b, which is adjustably secured to the land 13b, as by the threaded spindle portion 17b. Similarly, compensating conduit 15b communicates with drain pipe 9b at the upstream side of valve 14b and delivers the compensating liquid pressure to the annular chamber 18a, defined between the primary land 13a and another secondary land 16a.

The manner in which the pilot valve arrangement of Fig. 1 effects the described compensating function may be seen by reference to the graphical representation of the forces involved in Fig. 2.

Assume first, for purpose of illustration, that the secondary lands 16a, 16b, and the respective compensating liquid conduits 15a, 15b are not present, so that the valve is in accordance with conventional practice. If, now, an input force applied to the pilot valve rod 10a should cause spindle 10 to move to the left, motive fluid from conduit 8 is admitted past the spindle portion 12b to supply conduit 5b and the righthand end of motor 1, so as to cause piston 3 to move to the left. This piston movement is, of course, permitted by the fact that the liquid at the other side of piston 3 is exhausted through conduit 5a, past the reduced spindle portion 12a, and through exhaust conduit 9a. As will be appreciated by those skilled in the art, as soon as the central land 11 moves leftward so as to define a small orifice with the port 8a, liquid begins flowing at high velocity through this restricted orifice. The result is that a characteristic non-uniform static pressure distribution is produced across the righthand face of the central land 11. More specifically, this high velocity flow will create a reduced local static pressure immediately adjacent the orifice, as compared with the static pressure which exists elsewhere in the chamber 12d.

The net result of this non-uniform static pressure distribution across the righthand end face of central land 11 is to produce a reaction force R which is in the direction tending to move spindle 10 to the right, i. e., in the valve-closing direction. This reaction force is represented by curve 19 in Fig. 2. With a valve arranged generally as shown in Fig. 1, it will ordinarily be found that this curve 19 reaches a maximum value at about 25% of the total travel of the pilot valve spindle 10. As the spindle moves beyond the 25% position, the size of the orifice defined between the central land 11 and the port 8a increases rapidly in size, the velocity through the restricted orifice defined therebetween decreases, and the static pressure distribution across the righthand end surface of land 11 becomes more nearly uniform. With the port 8a wide open (at "100% travel"), there is no restriction to the flow of motive fluid from the conduit 8 to the supply conduit 5b, and the reaction force R is essentially zero.

It will, of course, be understood that, when the spindle 10 moves to the right, the high velocity flow through the restricted orifice defined between port 8a and central land 11 into the chamber 12c produces a similar reaction force R but in the opposite direction.

It will be obvious that the occurrence of this variable reaction force R can have a serious effect on the sensitivity and stability of a servomotor where the input force applied to the rod 10a is very small, so that the reaction force is relatively large in comparison with the input signal force.

The prior art has attempted to solve this problem by using a comparatively small primary pilot valve with a spindle positioned by the small input force, and passing only a comparatively small amount of motive fluid through this primary pilot valve to position a larger pilot valve, which, in turn, controls the main flow of motive liquid to the hydraulic output motor. This renders the servomotor system much more expensive and complicated, and at the same time subject to increased service and maintenance troubles. With the present invention, the unbalanced reaction force can be so nearly compensated that such additional stages of hydraulic amplification become unnecessary.

With a pilot valve incorporating the invention, as illustrated in Fig. 1, the operation is as follows. The initial high velocity flow past the primary land 11 into chamber 12d creates the reaction force R on the right-hand end surface thereof as before, but now the exhaust liquid in the drain conduit 9a builds up a pressure behind the flow restriction 14a, which pressure is communicated by conduit 15a to the chamber 18b, where it exerts a force to the left on the end surface 13b, noting that the compensating liquid escapes through the restricted annular bleed port 19b and that the pressure across the secondary land 16b is equalized by one or more generously proportioned passages 16d. Thus, it will be seen that this compensating pressure on the end surface of land 13b gives a force in a direction to oppose the reaction force R caused by the high velocity flow from supply conduit 8 into the space 12d. This compensating force C is illustrated by the curve 20 in Fig. 2. It will be obvious that the net reaction force remaining on the spindle 10 is the arithmetic sum of the positive reaction force R and the negative compensating force C. The net unbalanced reaction force $r$ is represented by the curve 21, 21a in Fig. 2.

Without the secondary or compensating lands 16a, 16b, the compensating force C would rapidly increase as represented by the projected portion 21a of curve 21 in Fig. 2, so as to "overcompensate," and the net force $r$ would again increase to an undesirable value (since the reaction force R decreases to zero when the pilot valve approaches its fully open position). Thus, the compensating force C, if uncontrolled, would introduce disturbances very similar to those which the compensating effect is intended to eliminate. The function of the secondary lands 16a, 16b is to progressively shut off the flow of compensating liquid so that the compensating force decreases to zero when the valve reaches its 100% open position.

Returning now to the example in which the spindle 10 moves to the left and the compensating liquid is supplied to the righthand chamber 18b, it will be apparent that, after roughly ¼ of the spindle's travel, the secondary land 16b will begin to shut off the port 15d.

As spindle 10 continues to move to the left, land 16b progressively closes off the port 15d so that the compensating force C decreases to zero when the spindle 10 is in its extreme lefthand position with land 16b completely blocking port 15d. The result is that the curve representing the net unbalanced reaction force $r$ in Fig. 2 departs from the projected curve 21a, the net force $r$ being now represented by the curved portion 21b, which curve returns to zero at the 100% open position.

It will be apparent from Fig. 2 that the effect of the compensating arrangement has been to reduce the net unbalanced reaction force to a small fraction of its former maximum value, and the unbalanced force is much more nearly constant over the whole travel of the pilot valve spindle. With further refinements, the compensating effect may be even more complete. For instance, the secondary lands 16a, 16b, instead of being simple cylindrical members may be appropriately contoured so that the effective area of the orifice defined by the secondary lands and the respective compensating ports 15c, 15d varies according to a preselected schedule, so that the shape of the compensated curve 21b is more nearly as desired.

Furthermore, it is to be noted that the steepness of the compensating force curve 20 can be altered simply by adjustment of the regulating valves 14a, 14b. Closing these valves will increase the pressure of the compensating liquid supplied to the conduits 15a, 15b so that the compensating force available is increased. Thus, by suitable proportioning of the cut-off lands 16a, 16b and appropriate regulation of the valves 14a, 14b, the net unbalanced reaction force r may be reduced to a maximum value of perhaps 10% of the value obtaining when the invention is not used.

It should also be noted that the shape of the net curve 21, 21b may be modified by varying the "cut-off point," which is, of course, the point in the travel of the valve spindle at which the secondary land begins to close off the compensating fluid port. This adjustment may be readily effected by loosening the respective lock nuts 17c, 17d and varying the axial spacing of the secondary land from the primary land by rotating the threaded spindle portions 17a, 17b. It will also be seen that the cut-off point may be different for righthand movement of the spindle than for lefthand movement thereof. Thus, the unbalanced reaction curve 21, 21b may not only be shaped to suit the designer, but may be different for either direction of motion.

It will be observed that the cut-off land 16a, or 16b, or both, may be adjusted so that they have no effect in covering the respective ports 15c, 15d, with the result that the above-described compensating effect is produced only for about the first 25% of the valve travel, after which the net unbalanced reaction force would follow the curve 21a in Fig. 2. This method of operation may be found desirable in some applications. Of course, if this is the only intended method of operation, the cut-off lands may be removed altogether.

A still further refinement is illustrated diagrammatically in Fig. 3, which is identical to the construction of Fig. 1 except that the end chambers 22a, 22b, defined between the respective secondary lands 16a, 16b, and the ends 7a, 7b of the pilot valve housing, are connected by conduits 23a, 23b to the drain conduits 9a, 9b, respectively, at the downstream sides of the control valves 14a, 14b. With this arrangement, the pressure at opposite sides of the secondary land 16a is substantially equalized by the generous passages 16c provided therethrough. The flow through the compensating conduit 15b is produced by the pressure drop occurring across the control valve 14b when the spindle 10 moves to the right. If, now, a secondary control valve 23c is inserted in the compensating liquid discharge line 23a, the compensating force applied to the lefthand side of primary land 13a may be finely regulated.

Thus, it will be apparent that the invention provides a very versatile arrangement for compensating to almost any desired degree, and according to various preselected schedules, the unbalanced reaction force which would otherwise be imposed on the pilot valve spindle.

While, so far, the invention has been described as applied to the problem of reducing the unbalanced hydraulic reaction force occurring on the pilot valve spindle, it may also be applied to certain cases where it is desired to increase this reaction force. This effect may be desired, for instance, in order to cause the spindle to tend to return to its neutral position whenever the input force is removed. Thus, the inherent hydraulic forces acting on the spindle will cause it to snap back to its mid-position whenever the input force is removed, without the necessity of actually applying an input force in the return direction or employing springs or equivalent means to return the spindle to its neutral condition. Having the reaction force increase as the travel increases also tends to improve the stability of certain hydraulic servomotors.

For such method of operation, the construction of the pilot valve may be exactly as shown in Figs. 1 or 2, except that the compensating liquid conduit 15a is connected to the near end of the cylinder, instead of the remote end, as shown in Fig. 1. Likewise, the compensating liquid conduit 15b is connected to the righthand end of the cylinder 6a. This piping arrangement is illustrated in Fig. 4.

It will be seen that the invention may be applied either for reducing or eliminating the reaction force, as illustrated diagrammatically in Fig. 2, or may be employed to increase the hydraulic reaction force in order to improve the stability by increasing the tendency of the pilot valve spindle to return to its neutral position when the input force is removed.

In addition to the modifications suggested above, still others will occur to those skilled in the art, and it is desired to cover by the appended claims all such changes as fall within the true spirit and scope of the invention.

What I claim as new and desire to secure by Letters Patent of the United States is:

1. In a fluid pressure servomotor pilot valve having a housing forming an inlet port and two sets of supply and drain ports with a longitudinally slidable spindle having a central land adapted to control the flow of motive fluid from the inlet port to said respective supply ports and a pair of primary lands spaced axially at either side of the central land and adapted to connect the respective supply ports with the drain ports, the combination of a drain conduit communicating with one of said drain ports and having flow restricting means, and a compensating conduit communicating the fluid pressure at the upstream side of said flow restriction to an exterior end surface of one of said primary lands, whereby the pressure of the spent fluid exhausted from the drain port imposes a force on the spindle modifying the hydraulic reaction force caused by high velocity flow of motive fluid from the inlet port past the central land to one of the supply ports.

2. A fluid pressure pilot valve in accordance with claim 1 and including an auxiliary land secured to the spindle in axially spaced relation from the side of a primary land remote from the central land, the compensating conduit being connected to a port communicating with the annular chamber defined between the primary and auxiliary lands, the auxiliary land being adapted to cover said port after a preselected travel of the spindle to modify the compensating force applied to the spindle.

3. A fluid pressure pilot valve in accordance with claim 1 and including means for adjusting the axial spacing of the auxiliary land from the adjacent primary land whereby the degree of modification of the reaction force by the compensating force can be varied.

4. A fluid pressure pilot valve in accordance with claim 1 and including adjustable means for variably restricting the drainage of compensating liquid from the end of the pilot valve cylinder containing the auxiliary land.

5. In a fluid pressure servomotor pilot valve having a housing with an inlet port and two sets of supply and drain ports, drain conduits connected to said drain ports, a movable member having a first portion adapted to control the flow of motive fluid from the inlet port to said respective supply ports and other portions adapted to effect communication between the respective drain ports and supply ports, the combination of walls forming at least one auxiliary pressure chamber constructed and arranged to apply a fluid pressure to the end of the movable member in opposition to the hydraulic reaction force produced thereon by the high velocity flow of motive fluid from the inlet port past said first movable member portion, means restricting the flow of fluid through a drain conduit, and compensating conduit means communicating spent motive fluid under pressure from the drain conduit at the upstream side of said flow restriction to said auxiliary chamber.

6. In a fluid pressure servomotor pilot valve having a housing with an inlet port and two sets of supply and drain ports with a longitudinally slidable spindle including lands adapted to control the flow of motive fluid from the inlet port to one of said supply ports while connecting the other supply port with a drain port, the combination of means for modifying the hydraulic reaction force tending to return the pilot valve spindle to its neutral condition blocking the inlet port including a drain conduit communicating with one of the drain ports and having flow restricting means, and a compensating conduit communicating the fluid pressure at the upstream side of said flow restriction to the outer end surface of one of said flow control lands, whereby the pressure of the fluid exhausted through the drain conduit imposes a compensating force on the spindle to modify the hydraulic reaction force caused by high velocity flow of motive fluid from the inlet port past the inlet control land.

ARNE LOFT.

REFERENCES CITED

The following references are of record in the file of this patent:

UNITED STATES PATENTS

| Number | Name | Date |
|---|---|---|
| 2,566,051 | Avery | Aug. 28, 1951 |